(12) United States Patent
Osman et al.

(10) Patent No.: US 8,788,979 B2
(45) Date of Patent: Jul. 22, 2014

(54) SECONDARY ACTIONS ON A NOTIFICATION (75) Inventors: Heiwad Hamidy Osman, Seattle, WA (US); Holger Kuehnle, Seattle, WA (US); Saurabh Wagh, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 133 days.

(21) Appl. No.: 13/229,700

(22) Filed: Sep. 10, 2011

(65) Prior Publication Data

US 2013/0067421 A1 Mar. 14, 2013

(51) Int. Cl.
*G06F 3/033* (2013.01)
*G06F 3/048* (2013.01)

(52) U.S. Cl.
USPC ........... 715/863; 715/808; 715/812; 715/828; 715/833

(58) Field of Classification Search
CPC . G06F 3/0481; G06F 3/0482; G06F 3/04845; G06F 3/0487; G06F 3/0237
USPC ......... 715/863, 808, 812, 828, 833, 708, 810, 715/835; 345/684, 672; 709/217
See application file for complete search history.

(56) References Cited

U.S. PATENT DOCUMENTS

| | | | |
|---|---|---|---|
| 5,854,629 A * | 12/1998 | Redpath | 715/830 |
| 7,260,610 B2 | 8/2007 | Grooters et al. | |
| 2007/0157125 A1 * | 7/2007 | Peters | 715/837 |
| 2008/0052945 A1 * | 3/2008 | Matas et al. | 34/173 |
| 2009/0146908 A1 | 6/2009 | LeJeune et al. | |
| 2009/0249247 A1 | 10/2009 | Tseng et al. | |
| 2009/0258636 A1 * | 10/2009 | Helvick | 455/414.2 |
| 2010/0058231 A1 * | 3/2010 | Duarte et al. | 715/800 |
| 2010/0060473 A1 | 3/2010 | Konno et al. | |
| 2010/0257490 A1 * | 10/2010 | Lyon et al. | 715/863 |
| 2010/0295805 A1 * | 11/2010 | Shin et al. | 345/173 |
| 2011/0080356 A1 | 4/2011 | Kang et al. | |
| 2012/0192056 A1 * | 7/2012 | Migos et al. | 715/230 |

OTHER PUBLICATIONS

"Hide Notification Bar but Keep the Functionality with Nexus", Retrieved from: <http://www.reddit.com/r/Android/comments/hnwfl/hide_notification_bar_but_keep_the_functionality/> on Jun. 17, 2011,(May 30, 2011), 4 pages.
"Hide notification bar but keep the functionality with Nexus S", Retrieved at <<http://www.reddit.com/r/Android/comments/hnwfl/hide_notification_bar_but_keep_the_functionality/>>, Retrieved Date: Jun. 17, 2011, pp. 4.

\* cited by examiner

*Primary Examiner* — Kieu Vu
*Assistant Examiner* — Asteway T Gattew
(74) *Attorney, Agent, or Firm* — Sung Kim; Andrew Sanders; Micky Minhas (57) ABSTRACT

Various embodiments enable notifications to be generated in both touch and non-touch environments. In at least some embodiments, a notification window is presented and a drag operation can reveal one or more secondary actions that can be performed. In at least some embodiments, selection of one or more of the secondary actions can occur independent of, and without utilizing additional special affordances, such as buttons.

25 Claims, 8 Drawing Sheets

SECONDARY ACTIONS ON A NOTIFICATION

BACKGROUND

Typically, a user can receive notifications by way of various applications on their computing device. The notifications can enable the user to perform a number of primary actions and so-called secondary actions. A primary action can include activating or dismissing the notification. The notifications tend to expose the secondary actions by way of additional user interface buttons that are placed on the relevant user interface surface. By clicking on a particular button, the secondary actions can be further revealed and selected. Other ways of exposing secondary actions include using a context menu employing a standard menu invocation, such as a right-click, to present a drop-down selection of secondary actions.

As computing device environments change and evolve, challenges continue to be presented with respect to streamlining the user's experience, particularly in ways a user can interact with their applications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments enable notifications to be generated in both touch and non-touch environments. In at least some embodiments, a notification window is presented and a drag operation can reveal one or more secondary actions that can be performed. In at least some embodiments, selection of one or more of the secondary actions can occur independent of, and without utilizing additional special affordances, such as buttons.

In at least some embodiments, gestural inputs received by way of the notification window can be utilized in connection with inertial and/or snap point processing to reveal and/or dismiss secondary actions. Furthermore, at least some embodiments employ a "learning" approach which provides a user with hints about secondary actions that can be revealed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments enable notifications to be generated in both touch and non-touch environments. In at least some embodiments, a notification window is presented and a drag operation can reveal one or more secondary actions that can be performed. In at least some embodiments, selection of one or more of the secondary actions can occur independent of, and without utilizing additional special affordances, such as buttons.

In at least some embodiments, gestural inputs received by way of the notification window can be utilized in connection with inertial and/or snap point processing to reveal and/or dismiss secondary actions. Furthermore, at least some embodiments employ a "learning" approach which provides a user with hints about secondary actions that can be revealed.

In the following discussion, an example environment is first described that is operable to employ the techniques described herein. Example illustrations of the gestures and procedures are then described, which may be employed in the example environment, as well as in other environments.

Example Environment

Figure 1:
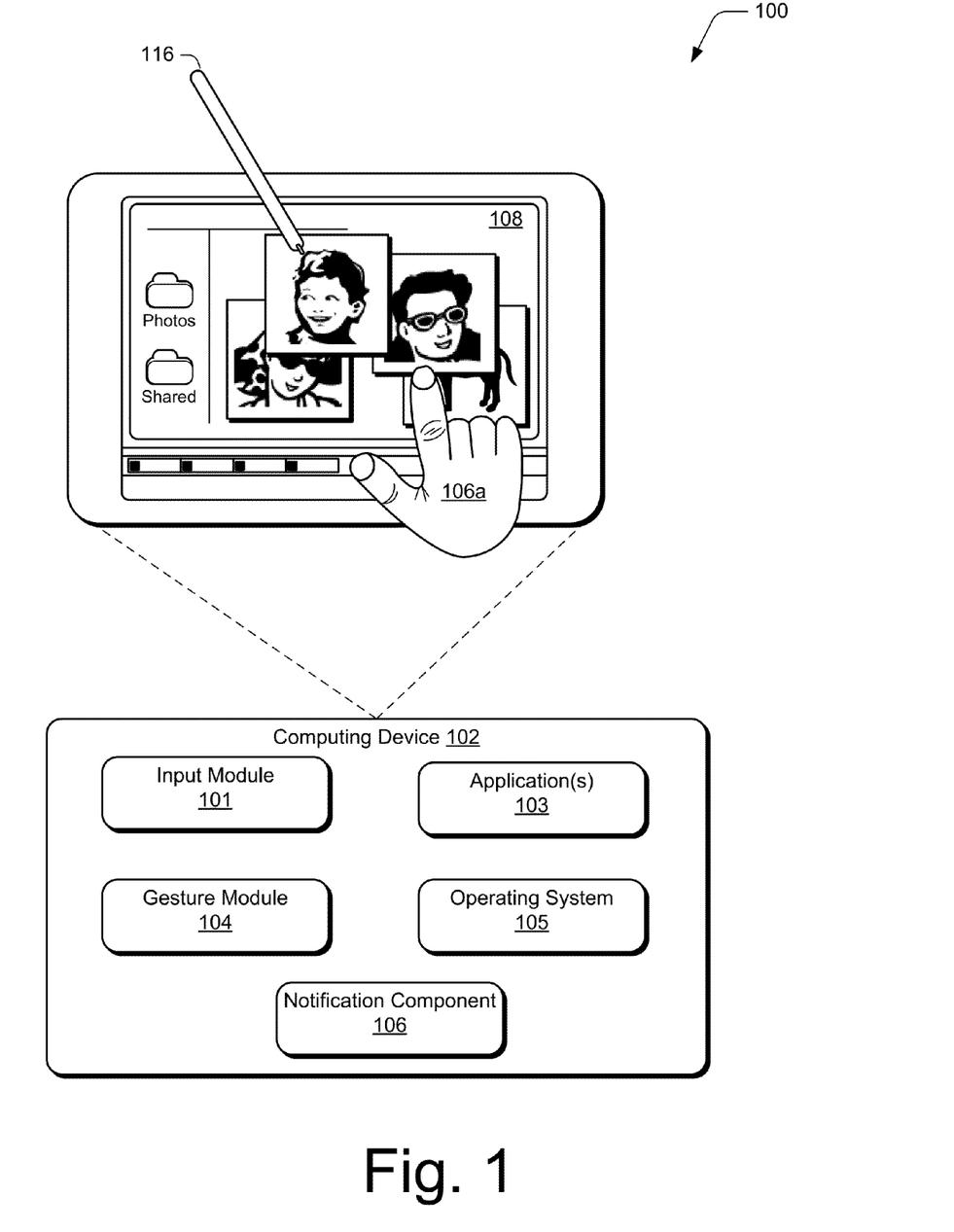
FIG. 1 is an illustration of an environment in an example implementation in accordance with one or more embodiments.

FIG. 1 is an illustration of an environment 100 in an example implementation that is operable to employ the embodiments as described herein. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a slate or tablet device, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, handheld game consoles). The computing device 102 also includes software that causes the computing device 102 to perform one or more operations as described below.

The computer device 102 includes an input module 101, one or more applications 103, a gesture module 104, an operating system 105, and a notification component 106.

Input module 101 is representative of functionality that enables computing device 102 to receive input from various input devices such as a mouse and other non-touchscreen input devices.

Applications 103 can be any suitable type of application. At least some of the applications are configured to generate notifications or have notifications generated on their behalf for presentation, as will become apparent below. In some instances, the system, such as the operating system, can generate a notification to communicate system state information to a user.

Gesture module 104 is operational to provide gesture functionality as described in this document. The gesture module can be implemented in connection with any suitable type of hardware, software, firmware or combination thereof. In at least some embodiments, the gesture module is implemented in software that resides on some type of tangible, computer-readable storage medium, examples of which are provided below.

Gesture module 104 is representative of functionality that recognizes gestures, including gestures that can be utilized to expose secondary actions by way of various notifications. The gestures can include and be performed by one or more fingers. The gestures may be recognized by module 104 in a variety of different ways. For example, the gesture module 104 may be configured to recognize a touch input, such as a finger of a user's hand 106a as proximal to display device 108 of the computing device 102 using touchscreen functionality.

Module 104 can also be utilized to recognize single-finger gestures and bezel gestures, multiple-finger/same-hand gestures and bezel gestures, and/or multiple-finger/different-hand gestures and bezel gestures.

The computing device 102 may be configured to detect and differentiate between a touch input (e.g., provided by one or more fingers of the user's hand 106a) and a stylus input (e.g., provided by a stylus 116). The differentiation may be performed in a variety of ways, such as by detecting an amount of the display device 108 that is contacted by the finger of the user's hand 106 versus an amount of the display device 108 that is contacted by the stylus 116.

Thus, the gesture module 104 may support a variety of different gesture techniques through recognition and leverage of a division between stylus and touch inputs, as well as different types of touch inputs.

Operating system 105 is representative of functionality that is provided by an operating system including, by way of example and not limitation, resource management, abstraction of system resources to enable components of a computing device, such as applications and other components, to interact with the resources, and the like. In at least some embodiments, operating system 105 brokers the notification process for the applications 103, as will be described below.

Notification component 106 is representative of functionality that enables notifications and exposes secondary actions associated with the notifications. The notification component can be a stand-alone component, as illustrated in the figure. Alternately or additionally, the notification component or aspects of the notification component can be implemented by operating system 105. For example, in the embodiments in which the operating system 105 serves as a broker for the notification process, aspects of the notification component can be implemented by the operating system.

Figure 2:
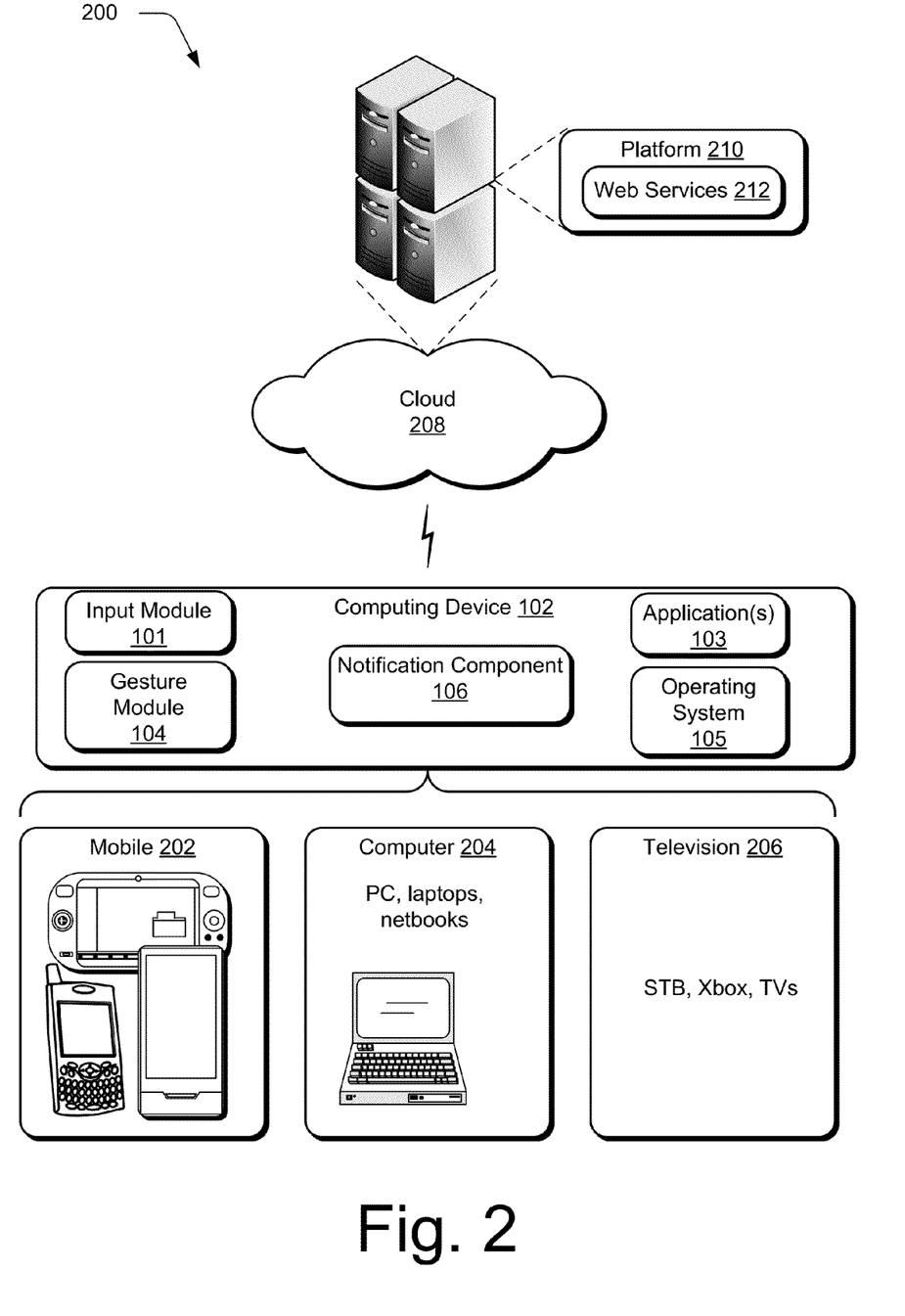
FIG. 2 is an illustration of a system in an example implementation showing FIG. 1 in greater detail.

FIG. 2 illustrates an example system showing the computing device 102 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices.

In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks. For example, the gesture module 104 may be implemented, in part, on the computing device 102 as well as via a platform 210 that supports web services 212. Platform-based implementations can include those in which the device is a thin client that transmits input back to a remote device that handles the associated processing.

In at least some embodiments, platform 210 and web services 212 can generate notifications and push them to computing device 102 for handling as described below. In at least some embodiments notifications can be generated without the associated application on computing device 102 being in context or even running. In at least some embodiments, notification component 106 is communicatively linked to platform 210 and web services 212 to accept notifications from either or both, as well as from applications 103.

The gesture techniques supported by the gesture module may be detected using touchscreen functionality in the mobile configuration 202, track pad functionality of the computer 204 configuration, detected by a camera as part of support of a natural user interface (NUI) that does not involve contact with a specific input device, and so on. Further, performance of the operations to detect and recognize the inputs to identify a particular gesture may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

In the discussion that follows, various sections describe example embodiments for exposing secondary actions associated with a notification. A section entitled "Drag to Reveal and Dismiss Secondary Actions" describes how drag operations can be utilized to reveal and dismiss secondary actions. Following this, a section entitled "Using Inertia and/or Snap Points" describes how inertia and snap points can be used to reveal secondary actions in accordance with one or more embodiments. Next, a section entitled "Use of N Slots for Secondary Actions" describes how various numbers of slots can be utilized to expose secondary actions. Following this, a section entitled "Populating Notifications without Application Code Running" describes how notifications can be populated without necessarily having an application's code running, in accordance with one or more embodiments. Next, a section entitled "Different Invocations Based on Input Type" describes how secondary actions can be invoked and displayed based on different types of invocations from different types of input mechanisms, in accordance with one or more embodiments. Next, a section entitled "Learnability" describes how various embodiments can be utilized to instruct or otherwise inform a user as to functionality associated with secondary actions. Following this, a section entitled "Different Interaction Patterns" describes different interaction patterns in accordance with one or more embodiments. Last, a section entitled "Example Device" describes aspects of an example device that can be utilized to implement one or more embodiments.

Drag to Reveal and Dismiss Secondary Actions

In one or more embodiments, a drag gesture can be utilized to reveal and dismiss secondary actions associated with the primary notification. As an example, consider FIG. 3 which illustrates an example environment 300 having a computing device 302 with a display screen 308.

Figure 3:
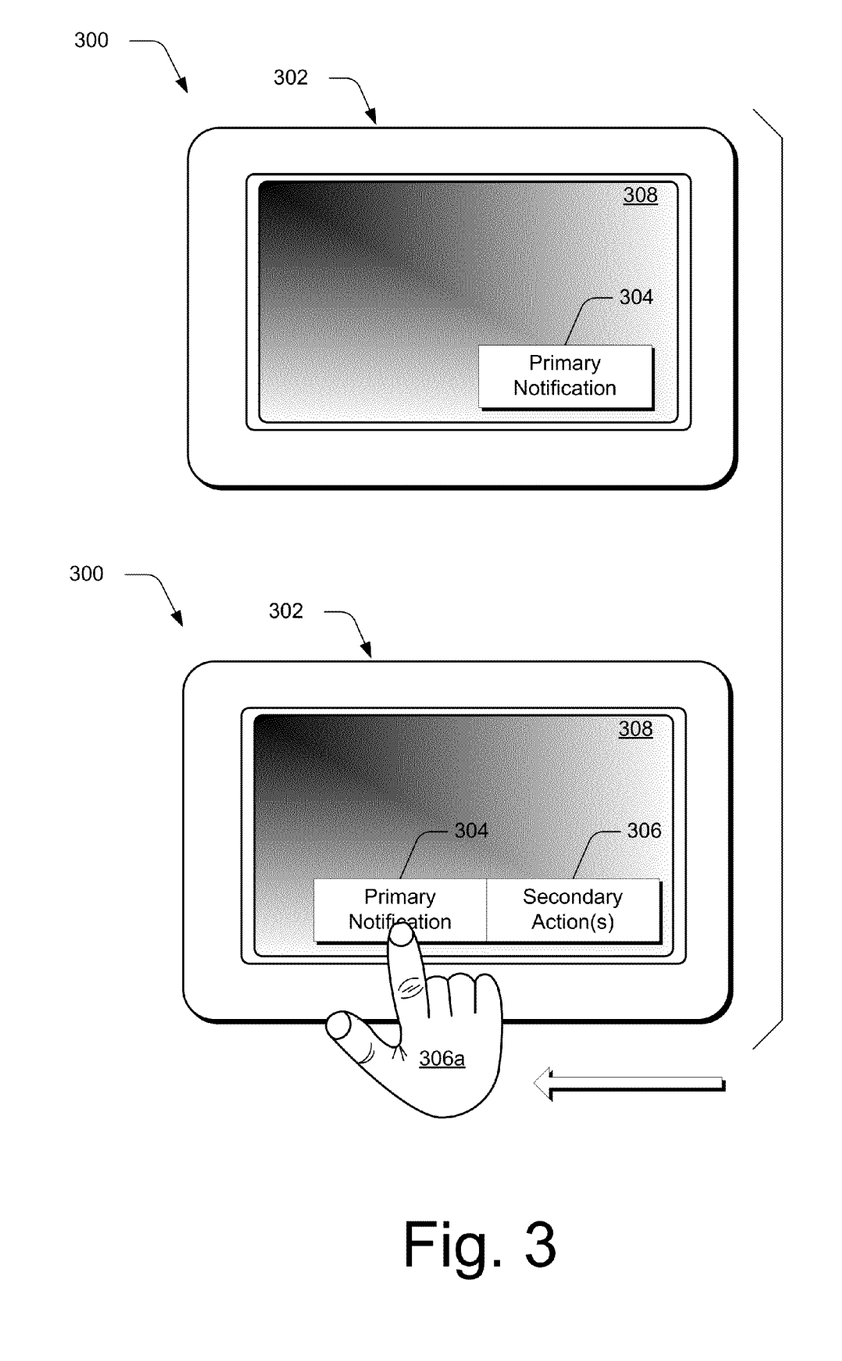
FIG. 3 illustrates an example computing device in accordance with one or more embodiments.

Assume in this example that the user is interacting with a first application whose content is displayed on display screen 308. Assume also that a primary notification 304 associated with a second different application is presented as shown. In the illustrated and described embodiment, primary notification 304 can slide in visually from the right side of the display screen 308 to its initial illustrated location. Any suitable way of presenting the primary notification can be used including, by way of example and not limitation, sliding in from other entry paths, such as from the left, top, bottom, corner and the like. Alternately or additionally, presentation of the primary notification can occur by the primary notification fading into view. It is to be appreciated and understood that presentation of the primary notification can occur in any suitable way and can be adapted responsive to various language nuances.

Once the primary notification slides into the display screen, the user can use a drag gesture, as illustrated by the user's hand 306a, in the bottommost portion of the figure, to reveal one or more secondary actions 306 associated with the primary notification. The primary notification can, itself, include a primary action that can be performed. In the illustrated and described embodiment, the primary notification 304 is dragged to the left, in the same direction that it was initially presented on the display screen. It is to be appreciated and understood, however, that the primary notification can be dragged in any suitable direction without departing from the spirit and scope of the claimed subject matter. Once the secondary action or actions are presented, the user may engage them in any suitable way. For example, a secondary action may be selected by simply tapping on a displayed secondary action or text that describes the secondary action. If multiple secondary actions are presented, any individual actions can be selected by tapping on individual displays associated with a desired action. For example, each secondary action may be described by a text string. By tapping on the text string, the user can select a particular secondary action among several actions. Selection can also occur via buttons, drop down menus, or other affordances in the secondary actions area.

For example, assume the user is working in a word processing application and receives a call from a friend. The primary notification 304 might indicate the name of the friend and that a call has been received. Responsive to receiving the primary notification, the user can gesturally expose one or more secondary actions associated with the primary notification. In this context, a primary action associated with the notification might be "receive" or "answer" call. The secondary actions can include, by way of example and not limitation, "send call to voice mail", "return predefined message", and the like. By simply tapping on the text string describing one of the secondary actions, the user can cause a secondary action to be performed.

In this particular example, the primary notification can be displayed without its associated application necessarily being in the foreground. For example, the application associated with the primary notification might appear in the background or be minimized along a task bar. Alternately or additionally, the application associated with the primary notification may not necessarily have any of its code being executed at the time. For example, the associated application may be closed and not running, as described below. In one or more embodiments, if the user chooses to tap on the primary notification 304, either in the configuration in the uppermost portion of the figure or the bottommost portion of the figure, the associated application can be launched or otherwise brought into context. If the user taps on a text string associated with a secondary action, the user can cause the secondary action to be performed. In the call example from above, if the user's associated application is running and minimized or otherwise in the background, tapping on a secondary action can cause the application to be brought into the foreground. Alternately or additionally, if the associated application is not running, tapping on the primary notification or a secondary action can cause the associated application to be launched. Further, the secondary actions could also perform an action and not bring the application to the foreground. For example, clicking on text such as "Send Busy Text" could respond with a pre-canned text message without bringing application to the foreground. This would reduce interruptions to the user's current context or workflow.

To dismiss a secondary action or actions 306, the user can perform the drag gesture in the opposite direction. In this particular example, because the user exposed the secondary action by dragging the primary notification 304 to the left, the secondary action or actions 306 can be dismissed by dragging the primary notification and/or the secondary action 306 to the right toward the edge from which the primary notification emerged.

In at least some embodiments, the secondary action or actions can be invoked without placing user-selectable, user interface buttons on the associated user interface. In addition, in at least some embodiments the primary notification can be received and secondary actions can be exposed without changing the user's current context relative to the application with which the user is currently interacting.

The above-described approach provides an intuitive and simple mechanism by which a user can reveal secondary actions associated with a primary notification.

Figure 4:
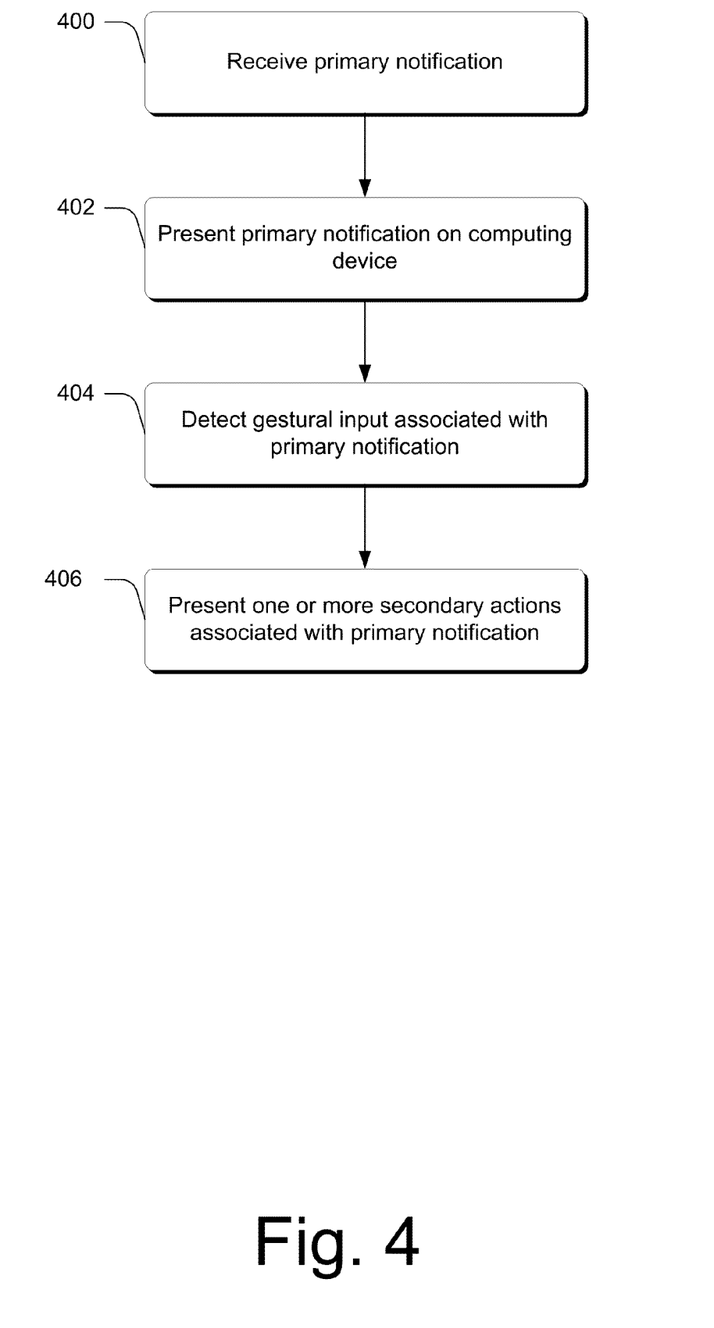
FIG. 4 is a flow diagram that describes steps in a method in accordance with one or more embodiments.

FIG. 4 is a flow diagram that describes steps in a method in accordance with one or more embodiments. The method can be performed in connection with any suitable hardware, software, firmware, or combination thereof. In at least some embodiments, the method can be performed by a suitably-configured computing device or computing devices as described above.

Step 400 receives a primary notification. Any suitable type of primary notification can be received. In addition, the primary notification can be received from any suitable source. For example, in at least some embodiments the primary notification can be received by an application executing on a local client device. Alternately or additionally, the notification can be received from a remote computing device, such as a server like the one described above. Further, this step can be performed by receiving content associated with the primary notification alone, or by receiving content associated with both the primary notification and associated second actions. Responsive to receiving the primary notification, step 402 presents the primary notification on a computing device. Any suitable type of presentation can be made, an example of which is provided above. Step 404 detects gestural input associated with the primary notification. Any suitable type of gestural input can be utilized. In the example given above, a gesture in the form of a swipe was utilized. Responsive to detecting the gestural input, step 406 presents one or more secondary actions associated with the primary notification. Examples of how this can be done are provided above. Once presented, the secondary actions can be selected and performed as described above and below.

As noted above, the primary notification and secondary actions can be dismissed using a gesture that is opposite to the one used to expose the secondary actions.

Having considered how drag gestures can be used to reveal and dismiss secondary actions, consider now how inertia and/or snap points can be utilized to display primary notifications and related secondary actions.

Using Inertia and/or Snap Points

In one or more embodiments, inertia can be utilized to present one or more secondary actions. Alternately or additionally, so-called snap points can be utilized to present one or more secondary actions.

With respect to the use of inertia, consider the following. In one or more embodiments, when the user utilizes a gesture relative to a primary notification in order to expose one or more secondary actions, if the gesture has sufficient inertia or velocity, such inertia or velocity can result in presentation of the secondary action or actions. Such inertia or velocity can be generated by a flick-type gesture. Typically, flick-type gestures are a type of swiping gesture in which the finger or fingers maintain contact with the display screen for a short period of time during which the finger or fingers engages the display screen at a fairly quick velocity. The quick-velocity, flick engagement initially accelerates the primary notification at a corresponding velocity. In at least some embodiments, the velocity can taper off and eventually slowdown to a stop at which point the secondary action or actions can be fully exposed. In at least some embodiments, utilizing inertia or velocity to expose secondary actions assumes that at some threshold velocity, the user's intent is to cause the secondary actions to be exposed. In at least some embodiments, a velocity that is insufficient to meet the velocity threshold may cause the primary notification to move a short distance to expose secondary actions, and then rebound back to its initial location. This type of functionality can inform the user of the presence of secondary actions such that if the user so desires, they can cause the secondary actions to be exposed. It is to be appreciated and understood that any suitable velocities can be utilized to implement this functionality.

In at least some other embodiments, a threshold distance or snap point can be defined such that a velocity sufficient to cause the primary notification to cross the threshold distance can cause presentation of the secondary actions. Alternately or additionally, simply dragging the primary notification a sufficient threshold distance can cause the primary notification to snap to a location adjacent which one or more secondary actions can be exposed.

Similarly, in at least some embodiments, velocity and/or distance thresholds can be utilized to dismiss secondary actions. For example, performing a quick-velocity flick in a direction opposite to the direction utilized to expose the secondary actions, can cause the secondary actions to be dismissed. Likewise simply dragging the primary notification a threshold distance may cause the secondary actions to be dismissed and for the primary notification to snap back to its initial location. Alternately or additionally, a higher-velocity flick can dismiss both the secondary and primary notifications.

Figure 5:
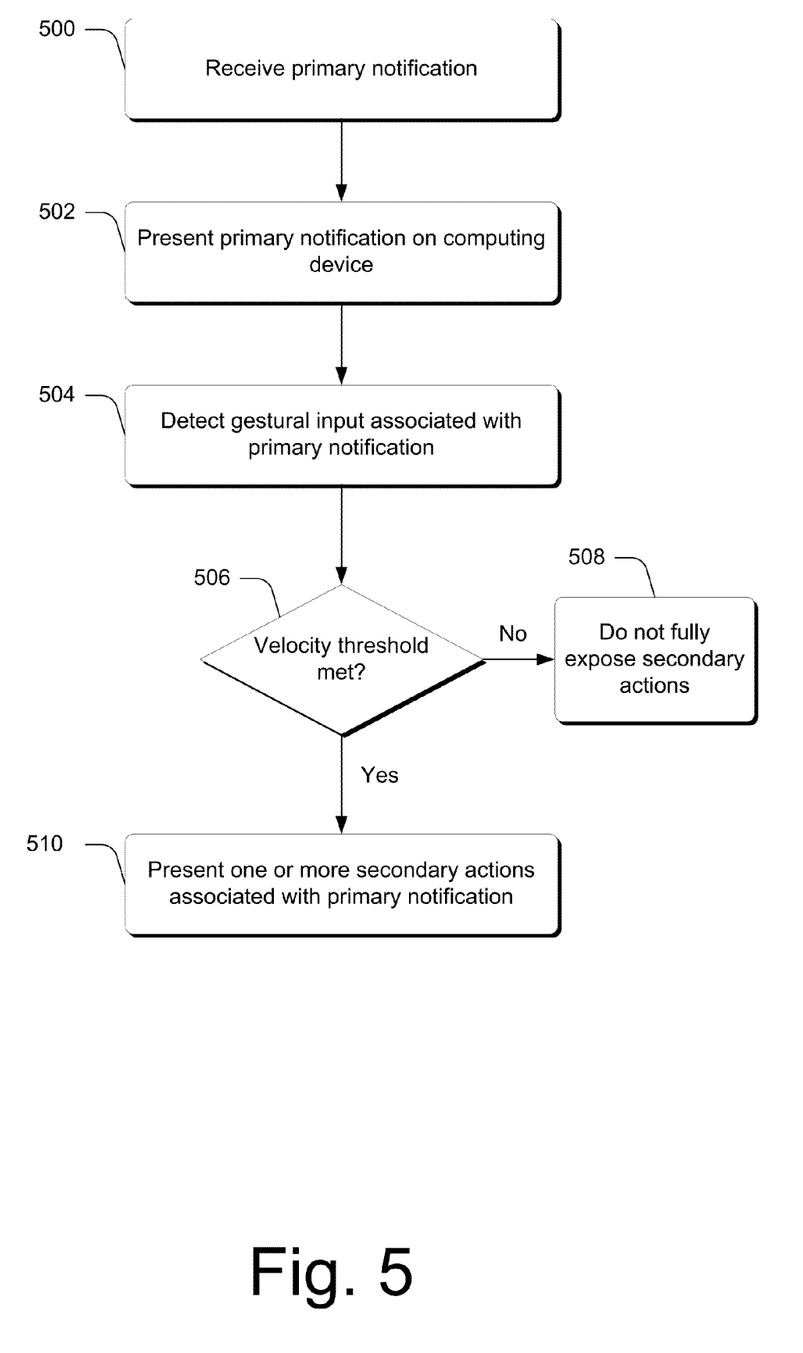
FIG. 5 is a flow diagram that describes steps in a method in accordance with one or more embodiments.

FIG. 5 is a flow diagram that describes steps in a method in accordance with one or more embodiments. The method can be performed in connection with any suitable hardware, software, firmware, or combination thereof. In at least some embodiments, the method can be performed by a suitably-configured computing device or computing devices as described above.

Step 500 receives a primary notification. Any suitable type of primary notification can be received. In addition, the primary notification can be received from any suitable source. For example, in at least some embodiments the primary notification can be received by an application executing on a local client device. Alternately or additionally, the notification can be received from a remote computing device, such as a server like the one described above. Further, this step can be performed by receiving content associated with the primary notification alone, or by receiving content associated with both the primary notification and associated second actions. Responsive to receiving the primary notification, step 502 presents the primary notification on the computing device. Any suitable type of presentation can be made, an example of which is provided above. Step 504 detects gestural input associated with the primary notification. Any suitable type of gestural input can be utilized. In the example given above, a gesture in the form of a swipe or flick was utilized. Responsive to detecting the gestural input, step 506 ascertains whether a velocity threshold is met. If the gesture's velocity does not meet the velocity threshold, step 508 does not fully expose the secondary actions. This step can be performed in any suitable way. For example, for gesture inputs whose velocity does not meet the velocity threshold, the secondary actions might be partially exposed, with the primary notification then sliding back into its initial position.

If, on the other hand, the gesture's velocity meets or exceeds the velocity threshold, step 510 presents one or more secondary actions associated with the primary notification. Examples of how this can be done are provided above.

Figure 6:
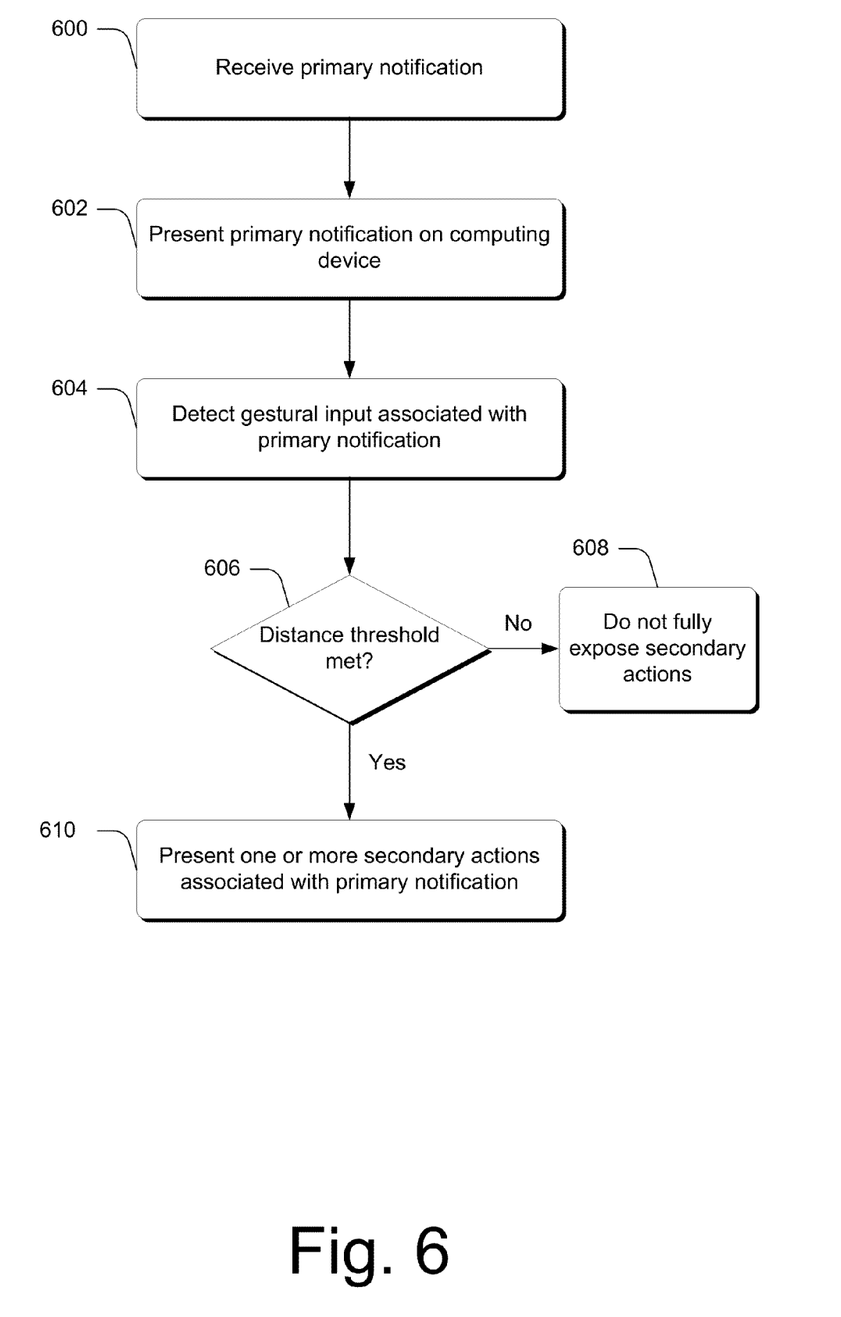
FIG. 6 is a flow diagram that describes steps in a method in accordance with one or more embodiments.

FIG. 6 is a flow diagram that describes steps in a method in accordance with one or more embodiments. The method can be performed in connection with any suitable hardware, software, firmware, or combination thereof. In at least some embodiments, the method can be performed by a suitably-configured computing device or computing devices as described above.

Step 600 receives a primary notification. Any suitable type of primary notification can be received. In addition, the primary notification can be received from any suitable source. For example, in at least some embodiments the primary notification can be received by an application executing on a local client device. Alternately or additionally, the notification can be received from a remote computing device, such as a server like the one described above. Further, this step can be performed by receiving content associated with the primary notification alone, or by receiving content associated with both the primary notification and associated second actions. Responsive to receiving the primary notification, step 602 presents the primary notification on the computing device. Any suitable type of presentation can be made, an example of which is provided above. Step 604 detects gestural input associated with the primary notification. Any suitable type of gestural input can be utilized. In the example given above, a gesture in the form of a swipe or flick was utilized. Responsive to detecting the gestural input, step 606 ascertains whether a distance threshold is met. If the gesture does not move the primary notification a distance that meets the distance threshold, step 608 does not fully expose the secondary actions. For example, the distance threshold might not be met if the gesture is a flick and the flick is not performed with sufficient velocity to cause the primary notification to cross the distance threshold. Alternately or additionally, when performing a low-velocity swipe, the user may lift their finger before crossing the distance threshold. In this instance, the primary notification can be returned to its initial location. This step can be performed in any suitable way. Responsive to gestures that do not meet the distance threshold, the secondary actions might be partially exposed, with the primary notification then sliding back into its initial position.

If, on the other hand, the gesture's distance meets or exceeds the distance threshold, step 610 presents one or more secondary actions associated with the primary notification. Examples of how this can be done are provided above.

Having considered how inertia and/or snap points can be utilized to expose primary notifications and related secondary actions, consider now embodiments that can utilize multiple so-called slots to enable multiple secondary actions to be exposed.

Use of N Slots for Secondary Actions

Figure 7:
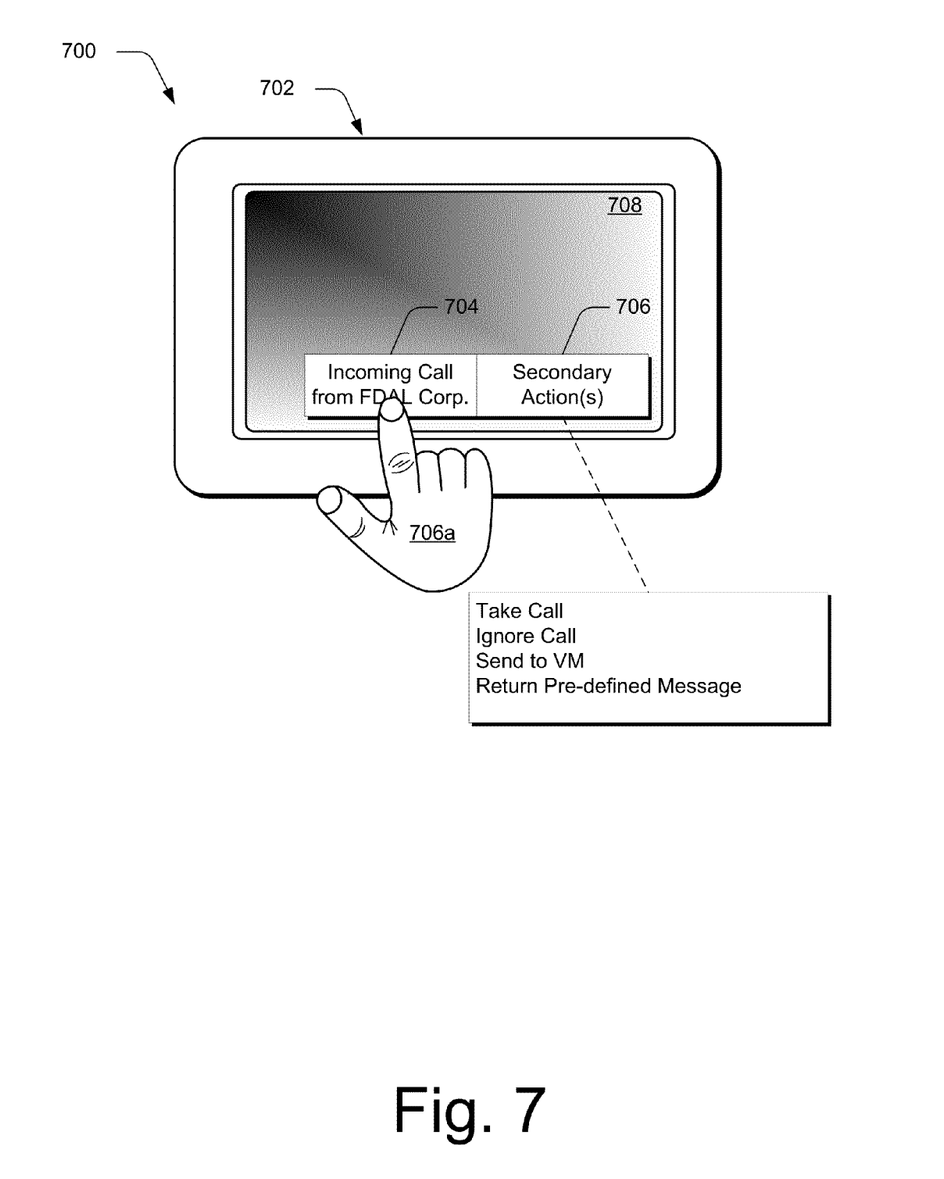
FIG. 7 illustrates an example computing device in accordance with one or more embodiments.

As an example, consider FIG. 7, which illustrates an example environment 700 in accordance with one or more embodiments. There, a computing device 702 has a display screen 708 on which a primary notification 704 has been displayed and gesturally moved to expose secondary actions 706. In the enlarged view shown just below the user's hand 706a, four different secondary actions are displayed. Each action is displayed in its own slot. So, for example, "take call" appears in its own slot as do "ignore call", "send to VM", and "return pre-defined message."

Any suitable number of slots can be utilized. In addition, in one or more embodiments, the window within which the secondary actions are presented may be scrollable or pannable to reveal additional secondary actions.

In addition, in one or more embodiments, at least some of the slots can be reserved for components other than those associated with the application associated with the notification. For example, at least one slot can be reserved for the operating system to enable configuration of notifications. As an example, consider the following.

In at least some embodiments, the primary notifications and secondary actions can be brokered by the operating system. Specifically, in these embodiments, an application can statically declare to the operating system various properties that pertain to the notifications that it initially wishes to display. These properties can define the notifications and secondary actions that can be populated. The operating system code then displays the windows associated with the primary notification and secondary actions and handles the interactions. For example, if a notification is received from a remote source such as a server, the operating system receives the notification and can cause the primary notification window to be displayed and populated with the primary notification. Once the user has selected a particular notification or secondary action, a callback is used to inform the application of the selection so that the application can cause an associated function to be performed. The operating system can reserve slots in the secondary notification display for its own functionality such as, by way of example and not limitation, enabling notification settings to be manipulated by the user.

In one or more embodiments, slots can be dynamically assigned. For example, rather than having a fixed number of slots, presentation could be automatically scaled, e.g., presentation of two secondary actions can be centered differently than if there were four secondary actions. Alternately or additionally, designs can have a single action occupy multiple slots (e.g., have a line of text that is bigger and more emphasized or wraps on two lines, causing a variable number of available slots to fit the space available.

Furthermore, in at least some embodiments, a secondary action area can be configured to scale in size from a minimum size to a maximum size.

Populating Notifications without Application Code Running

As noted above, notifications can be populated without an associated application's code being run at all. For example, in some instances a notification may originate from a cloud-type server. Specifically, a user may have installed a particular application and registered some information with a third-party service to enable this notification to occur. The third-party service may send the notification to a cloud service, such as a cloud-type server. The cloud-type server may then push the notification to the client computing device at which time the operating system code running on the client device can cause presentation of the notification. If the user then taps on the notification, the associated application can be launched.

Different Invocations Based on Input Type

In one or more embodiments, the functionality described above can be invoked using different types of input. For example, in the example described above, the functionality was invoked touch-based input. The same functionality can be invoked, in at least some embodiments, using other types of input mechanisms such as a mouse input mechanism, a stylus mechanism, a keyboard and the like. For example, using a mouse, invocation of the functionality may include right-clicking on a particular notification to reveal the secondary actions. In this case, right clicking on the notification may cause a notification to move over to expose the second actions. This could also occur by having an affordance on which a user clicks to cause the primary notification to move.

Learnability

As noted above, various embodiments can promote learning in the sense that a user can be educated as to the various functionality available through the primary notification.

For example, in at least some embodiments, when a primary notification enters the user interface, as by sliding in, it can slightly overshoot its initial resting location to reveal that a secondary action is accessible. In this manner, a user can be informed of the presence of the secondary action and can take appropriate measures to expose the secondary action.

In one or more other embodiments, learning can be promoted in the following way. If a user taps and holds down on a primary notification, the primary notification can move slightly to reveal a secondary action beneath it. Tap and hold can also be used to fully expose secondary actions, and tap and hold to close them again. Further, key presses like the context menu key on the keyboard can be used to bring up and expose secondary actions.

Different Interaction Patterns

In one or more embodiments, other interaction patterns can be provided. For example, in at least some embodiments, as noted above, a primary notification window or a secondary action window can be panned or scrolled to reveal different content within the boundary of the window. Both horizontal and vertical panning and scrolling can be provided.

In other embodiments, as a primary notification is dragged or moved to the left, rather than revealing items beneath it, a display can be rendered within a standard, non-changing window size which slides the secondary actions in from the right to occupy the second half of the window. Thus, it would appear that the secondary actions would be located just off the display screen to the right. In at least some embodiments, primary and secondary notifications can each have their own window, with one covering the other. In this instance, the secondary actions would not be dismissed. Rather, they would be hidden or covered by the window associated with the primary notification.

Example Device

Figure 8:
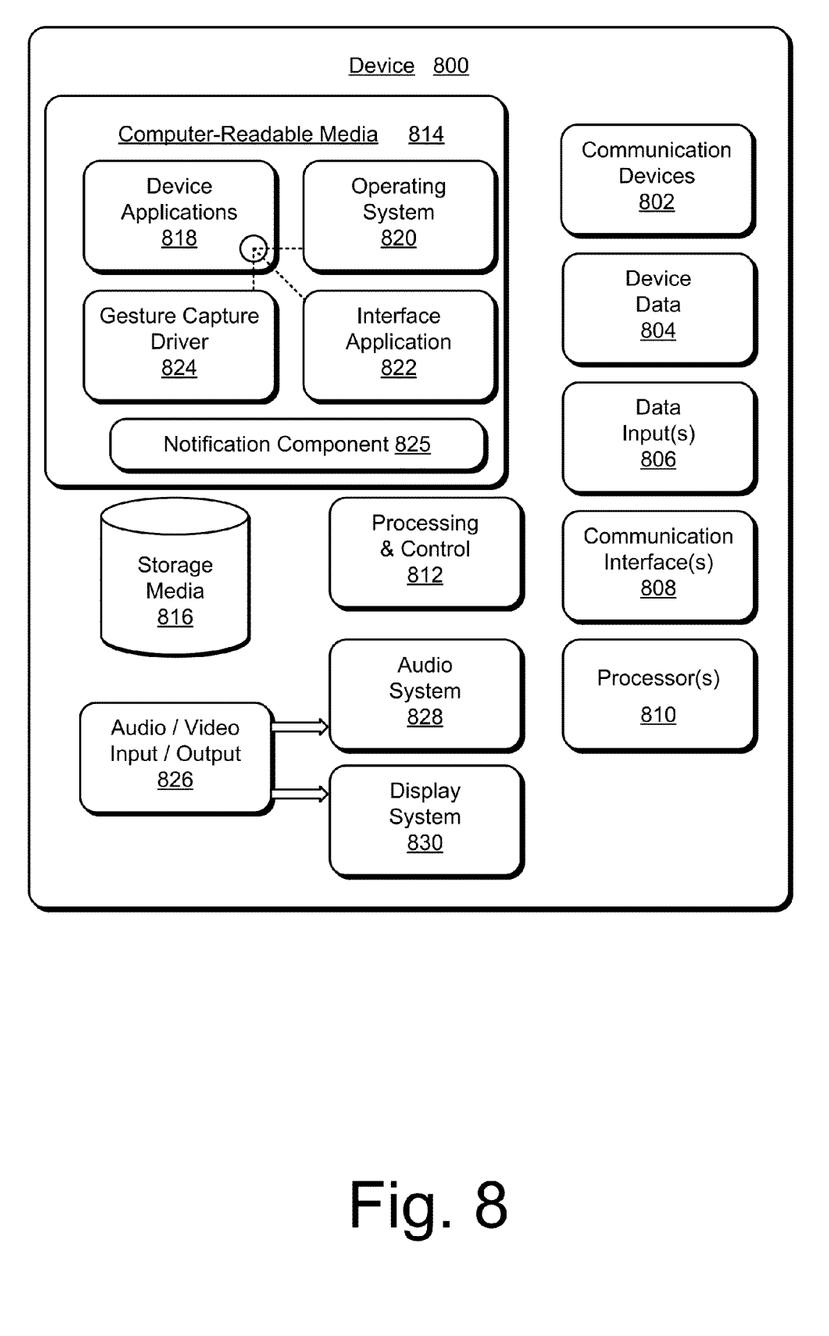
FIG. 8 illustrates an example computing device that can be utilized to implement various embodiments described herein.

FIG. 8 illustrates various components of an example device 800 that can be implemented as any type of portable and/or computer device as described with reference to FIGS. 1 and 2 to implement embodiments of the gesture techniques described herein. Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. The configuration settings can include downloaded media content that is embedded or embeddable in the secondary notification area. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable or readable instructions to control the operation of device 800 and to implement the gesture embodiments described above. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 818 also include any system components or modules to implement embodiments of the gesture techniques described herein. In this example, the device applications 818 include an interface application 822 and a gesture-capture driver 824 that are shown as software modules and/or computer applications. The gesture-capture driver 824 is representative of software that is used to provide an interface with a device configured to capture a gesture, such as a touchscreen, track pad, camera, and so on. Alternatively or in addition, the interface application 822 and the gesture-capture driver 824 can be implemented as hardware, software, firmware, or any combination thereof. In addition, computer readable media 814 includes a notification component 825 that operates as described above. Note that the notification component can be a stand-alone component or parts or the entirety of the notification component can be implemented by operating system 820.

Device 800 also includes an audio and/or video input-output system 826 that provides audio data to an audio system 828 and/or provides video data to a display system 830. The audio system 828 and/or the display system 830 can include any devices that process, display, and/or otherwise render audio, video, and image data. Video signals and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

CONCLUSION

Various embodiments enable notifications to be generated in both touch and non-touch environments. In at least some embodiments, a notification window is presented and a drag operation can reveal one or more secondary actions that can be performed. In at least some embodiments, selection of one or more of the secondary actions can occur independent of, and without utilizing additional special affordances, such as buttons.

In at least some embodiments, gestural inputs received by way of the notification window can be utilized in connection with inertial and/or snap point processing to reveal and/or dismiss secondary actions. Furthermore, at least some embodiments employ a "learning" approach which provides a user with hints about secondary actions that can be revealed.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
   receiving, using a computing device, a primary notification;
   responsive to receiving the primary notification, presenting the primary notification on a display screen of the computing device;
   detecting gestural input associated with the primary notification;
   ascertaining a velocity associated with the gestural input;
   responsive to detecting the gestural input and, based at least in part on ascertaining that the velocity has met a velocity threshold, presenting one or more secondary actions associated with the primary notification and continuing to present the primary notification; and
   responsive to detecting the gestural input and ascertaining that the velocity has not met the velocity threshold, partially exposing the one or more secondary actions and continuing to present the primary notification.

2. The method of claim 1, wherein said receiving a primary notification comprises receiving the primary notification from a remote computing device.

3. The method of claim 1, wherein the gestural input comprises a touch input.

4. The method of claim 1, wherein the gestural input comprises a touch input comprising a swipe.

5. The method of claim 1, wherein said presenting the one or more secondary actions further comprises presenting the one or more secondary actions responsive to ascertaining that a distance threshold associated with a distance the primary notification has been moved, has been met.

6. The method of claim 1, wherein said presenting the one or more secondary actions comprises:
   presenting the one or more secondary actions further responsive to ascertaining that a distance threshold associated with a distance the primary notification has been moved, has been met; and
   responsive to the gestural input not meeting the distance threshold and not meeting the velocity threshold, partially exposing the one or more secondary actions.

7. The method of claim 1, wherein said presenting the one or more secondary actions comprises presenting the one or more secondary actions in individual slots at least some of which are reserved for an operating system.

8. The method of claim 1, wherein said presenting the one or more secondary actions comprises presenting the one or more secondary actions in a scrollable or pannable window.

9. The method of claim 1, wherein presenting the primary notification comprises presenting the primary notification without an associated application's code being run.

10. One or more computer-readable storage memories storing computer-executable instructions thereon which, when executed, perform a method comprising:
    detecting gestural input associated with a primary notification that is displayed on a computing device display screen;
    ascertaining a distance that the gestural input has moved the primary notification;
    responsive to detecting the gestural input and, based at least in part on ascertaining that the distance has met a distance threshold, presenting one or more secondary actions associated with the primary notification and continuing to present the primary notification; and
    responsive to detecting the gestural input and ascertaining that the distance has not met the distance threshold, partially exposing the one or more secondary actions and continuing to present the primary notification.

11. The one or more computer-readable storage memories of claim 10, wherein the gestural input comprises a touch input.

12. The one or more computer-readable storage memories of claim 10, wherein the gestural input comprises a touch input comprising a swipe.

13. The one or more computer-readable storage memories of claim 10, wherein the presenting is performed, at least in part, by receiving the notification using an operating system and calling, with the operating system, an associated application to cause presentation of the one or more secondary actions.

14. The one or more computer-readable storage memories of claim 10 further comprising receiving the primary notification and, responsive to receiving the primary notification, presenting the primary notification on the display screen.

15. The one or more computer-readable storage memories of claim 10, wherein said presenting the one or more secondary actions further comprises presenting the one or more secondary actions responsive to ascertaining that a velocity associated with the gestural input has met a velocity threshold.

16. The one or more computer-readable storage memories of claim 10, wherein said presenting the one or more secondary actions comprises:
    presenting the one or more secondary actions further responsive to ascertaining that a velocity associated with the gestural input has met a velocity threshold; and
    responsive to the gestural input not meeting the velocity threshold and not meeting the distance threshold, partially exposing the one or more secondary actions.

17. A system comprising:
    one or more processors;
    one or more computer-readable media embodying computer-readable instructions which, when executed perform operations comprising:
    receiving, using a computing device, a primary notification;
    responsive to receiving the primary notification, presenting the primary notification on a display screen of the computing device;
    detecting gestural input associated with the primary notification;
    ascertaining a velocity associated with the gestural input;
    responsive to detecting the gestural input and, based at least in part on ascertaining that the velocity has met a velocity threshold, presenting one or more secondary actions associated with the primary notification and continuing to present the primary notification; and responsive to detecting the gestural input and ascertaining that the velocity has not met the velocity threshold, partially exposing the one or more secondary actions and continuing to present the primary notification.

18. The system of claim 17, wherein said receiving a primary notification comprises receiving the primary notification from a remote computing device.

19. The system of claim 17, wherein the gestural input comprises a touch input.

20. The system of claim 17, wherein the gestural input comprises a touch input comprising a swipe.

21. The system of claim 17, wherein said presenting the one or more secondary actions further comprises presenting the one or more secondary actions responsive to ascertaining that a distance threshold associated with a distance the primary notification has been moved, has been met.

22. The system of claim 17, wherein said presenting the one or more secondary actions comprises:

presenting the one or more secondary actions further responsive to ascertaining that a distance threshold associated with a distance the primary notification has been moved, has been met; and responsive to the gestural input not meeting the distance threshold and not meeting the velocity threshold, partially exposing the one or more secondary actions.

23. The system of claim 17, wherein said presenting the one or more secondary actions comprises presenting the one or more secondary actions in individual slots at least some of which are reserved for an operating system.

24. The system of claim 17, wherein said presenting the one or more secondary actions comprises presenting the one or more secondary actions in a scrollable or pannable window.

25. The system of claim 17, wherein presenting the primary notification comprises presenting the primary notification without an associated application's code being run.

* * * * *